United States Patent
Songlin et al.

(10) Patent No.: US 9,071,405 B2
(45) Date of Patent: Jun. 30, 2015

(54) OPTICAL LINE TERMINAL, OPTICAL NETWORK UNIT AND PASSIVE OPTICAL NETWORK SYSTEM

(75) Inventors: Zhu Songlin, Shenzhen (CN); Geng Dan, Shenzhen (CN); Zhang Weiliang, Shenzhen (CN); Zhang Dezhi, Shenzhen (CN)

(73) Assignee: ZTE CORPORATION, Shenzhen, Guangdong Province (CN)

(*) Notice: Subject to any disclaimer, the term of this patent is extended or adjusted under 35 U.S.C. 154(b) by 64 days.

(21) Appl. No.: 13/997,989

(22) PCT Filed: Jul. 22, 2011

(86) PCT No.: PCT/CN2011/077496
§ 371 (c)(1),
(2), (4) Date: Jul. 12, 2013

(87) PCT Pub. No.: WO2012/088878
PCT Pub. Date: Jul. 5, 2012

(65) Prior Publication Data
US 2013/0294774 A1    Nov. 7, 2013

(30) Foreign Application Priority Data

Dec. 29, 2010  (CN) .......................... 2010 1 0611680

(51) Int. Cl.
*H04L 7/00* (2006.01)
*H04Q 11/00* (2006.01)
(Continued)

(52) U.S. Cl.
CPC .......... *H04L 7/0075* (2013.01); *H04Q 11/0067* (2013.01); *H04Q 2011/0079* (2013.01);
(Continued)

(58) Field of Classification Search
CPC ............................. H04J 14/0247; H04B 10/04
USPC ......................................................... 398/58
See application file for complete search history.

(56) References Cited

U.S. PATENT DOCUMENTS 7,580,635 B2 *   8/2009   Li et al. ........................... 398/46
2006/0133809 A1 *  6/2006   Chow et al. ..................... 398/66
(Continued)

FOREIGN PATENT DOCUMENTS

CN   101009584 A   8/2007
CN   101557338 A   10/2009
(Continued)

OTHER PUBLICATIONS

Kazutaka Hara, 1.25/10.3-Gbit/s Dual-rate Burst-Mode Receiver with Automatic Bit-rate Discrimination Circuit for Coexisting PON Systems, Date of Conference: Jul. 11-14, 2010,Optical Internet (COIN), 2010 9th International Conference,E-ISBN : 978-14244-8221-4 ;Conference Location : Jeju, Korea (South) , pp. 1-3.*

(Continued)

*Primary Examiner* — David Payne
*Assistant Examiner* — Omar S Ismail
(74) *Attorney, Agent, or Firm* — Ling Wu; Stephen Yang; Ling and Yang Intellectual Property (57) ABSTRACT

The invention discloses are an optical line terminal, an optical network unit, a passive optical network system, an upstream bandwidth allocation method and a rate adaptation method. The OLT comprises: an optical module, a clock and data recovery module, a media access control chip and a control module, wherein, the optical module is configured to receive upstream data sent by ONUs having different transmission rates; the clock and data recovery module is configured to receive the upstream data, recover a clock signal according to the upstream data, and send the upstream data and the clock signal to the media access control chip; the media access control chip is configured to save the upstream data and the clock signal; the control module is configured to, according to the clock signal, acquire an upstream rate of the upstream data, and allocate an upstream bandwidth to the ONU according to the upstream rate.

8 Claims, 4 Drawing Sheets

(51) Int. Cl.
*H04J 3/06* (2006.01)
*H04J 14/02* (2006.01)

(52) U.S. Cl.
CPC ....... *H04J3/0697* (2013.01); *H04Q 2011/0064* (2013.01); *H04J 14/0247* (2013.01); *H04J 14/0252* (2013.01); *H04J 14/0282* (2013.01)

(56) References Cited

U.S. PATENT DOCUMENTS

| | | | |
|---|---|---|---|
| 2009/0232516 A1* | 9/2009 | Hirano | 398/182 |
| 2009/0304385 A1* | 12/2009 | Khermosh | 398/58 |
| 2010/0054752 A1* | 3/2010 | Kuribayashi et al. | 398/140 |
| 2010/0189440 A1* | 7/2010 | Julien et al. | 398/79 |
| 2010/0226649 A1 | 9/2010 | Cheng et al. | |

FOREIGN PATENT DOCUMENTS

| | | |
|---|---|---|
| CN | 101877798 A | 11/2010 |
| WO | 2009102422 A1 | 8/2009 |

OTHER PUBLICATIONS

Kazutaka Hara, 1.25/10.3-Gbit/s Dual-rate Burst-Mode Receiver with Automatic Bit-rate Discrimination Circuit for Coexisting PON Systems,Optical Internet (COIN), 2010 9th International Conference,Jeju Korea(South), Jul. 11-14, 2010, pp. 1-3.*
International Search Report for PCT/CN2011/077496 dated Oct. 13, 2011.

* cited by examiner

OPTICAL LINE TERMINAL, OPTICAL NETWORK UNIT AND PASSIVE OPTICAL NETWORK SYSTEM

TECHNICAL FIELD

The invention relates to the field of communication technology, and more particularly, to an optical line terminal, an optical network unit, a passive optical network system, an upstream bandwidth allocation method and a rate adaptation method.

BACKGROUND OF THE RELATED ART

Figure 1:
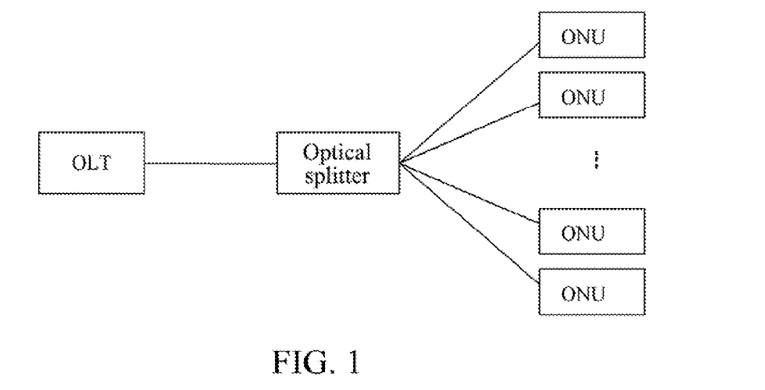
FIG. 1 is a topology structure of an existing PON system.

Gigabit-Capable Passive Optical Network (GPON) technology is a passive optical access technology applying a point-to-multipoint topology structure. The topology structure of the GPON system is shown in FIG. 1, wherein, the GPON comprises Optical Line Terminal (OLT) at the central office, Optical Network Units (ONUs) at the end user and an Optical Distribute Network (ODN), and a point-to-multipoint network structure is usually used. The ODN comprises single-mode optical fibers, optical splitters, optical connectors and other passive optical components, and the ODN provides optical transmission medium for the physical connection between the OLT and the ONUs.

To date, a downlink rate of 2.5 Gbit/s and an upstream rate of 1.25 Gbit/s are widely used in the GPON. With the development of communication technologies such as the Internet, the number of users accessing to the Passive Optical Network (PON) system is gradually increasing, so is the demand by the users for bandwidth, therefore, the next-generation PON technology based on the GPON technology has experienced rapid development and it is XG PON technology whose downlink rate is 10 Gbit/s and upstream rate is 2.5 Gbit/s (or 10 Gbit/s). Since the ratio of downlink rate to upstream rate in the traditional GPON technology is 2:1, based on this model, operators now proposed the rate demand that the next-generation PON technology is XG PON whose downlink rate is 10 Gbit/s and upstream rate is 5 Gbit/s (10 Gbit/s). To meet the need for upstream rate of 5 Gbit/s, in the prior art, it is proposed to use two 2.5 Gbit/s optical modules with different wavelengths to achieve the 5 Gbit/s upstream rate, however, this technique requires that the media access control chip in the OLT has two pairs of differential lines for receiving upstream data, which occupies hardware pin resources and is not conducive to the network upgrade and expansion, and the valuable wavelength resources are wasted. Another technique proposes to use double binary code technique to enable the optical module with a transmission rate of 2.5 Gbit/s to send data of 5 Gbit/s, but this technique requires using special modulation techniques, which greatly increases the cost of the ONUs, and a plurality of optical power budgets are lost in the upstream optical link in the PON system, which deteriorates the performance of the upstream optical link.

SUMMARY OF THE INVENTION

The invention provides an optical line terminal, an optical network unit, a passive optical network system, an upstream bandwidth allocation method and a rate adaptation method, to solve the problem of time division multiplexing coexistence of a plurality of rates supporting a single wavelength in an upstream direction without occupying existing wavelength resources and deteriorating the performance of upstream optical links.

In order to solve the aforementioned technical problem, the invention provides an optical line terminal (OLT), and said OLT comprises: an optical module, a clock and data recovery module, a media access control chip and a control module, wherein:

said optical module is configured to: receive upstream data sent by optical network units (ONUs) with different transmission rates and send said upstream data to said clock and data recovery module;

said clock and data recovery module is configured to: receive said upstream data, recover a clock signal according to said upstream data, and send said upstream data and said clock signal corresponding to said upstream data to said media access control chip;

said media access control chip is configured to: save said upstream data and said clock signal corresponding to said upstream data;

said control module is configured to: acquire an upstream rate of said upstream data according to said clock signal corresponding to said upstream data, and allocate a upstream bandwidth to said ONU according to said upstream rate.

In the aforementioned OLT, when there is one clock and data recovery module, said clock and data recovery module is configured to receive said upstream data, recover said clock signal, and send said upstream data and said clock signal corresponding to said upstream data to said media access control chip in the following manner: receiving upstream data with different transmission rates, recovering n channels of clock signals according to the number n of said ONUs with different transmission rates and said upstream data, and sending said upstream data and said clock signals corresponding to said upstream data to said media access control chip; or, recovering one channel of clock signal according to the number n of said ONUs with different transmission rates and said upstream data, and sending said one channel of clock signal and an electronic signal indicating the number of data lines for outputting parallel signals to said media access control chip; wherein, said n is a positive integer greater than 1.

In said OLT, there are at least two said clock and data recovery modules.

In said OLT, when said different transmission rates are 2.5 Gbit/s and 5 Gbit/s;

said clock and data recovery module is configured to recover said clock signal and send said upstream data and said clock signal corresponding to said upstream data to said media access control chip in the following manner: recovering two channels of clock signals according to 2.5 Gbit/s and 5 Gbit/s upstream data, and sending said upstream data and said clock signals corresponding to said upstream data to said media access control chip; or, recovering one channel of clock signal according to 2.5 Gbit/s and 5 Gbit/s upstream data, and for said 2.5 Gbit/s and 5 Gbit/s upstream data, respectively providing electronic signals indicating the number of data lines for outputting parallel signals, and sending said electronic signals to said media access control chip.

In the aforementioned OLT, when said different transmission rates are 2.5 Gbit/s and 5 Gbit/s, and there are two clock and data recovery modules, a first clock and data recovery module is configured to: according to 2.5 Gbit/s upstream data, recover a clock signal corresponding to s2.5 Gbit/s, and send said 2.5 Gbit/s upstream data and said clock signal corresponding to said 2.5 Gbit/s upstream data to a common media access control chip for said 2.5 Gbit/s and 5 Gbit/s upstream data or to a 2.5 Gbit/s media access control chip;

a second clock and data recovery module is configured to: according to 5 Gbit/s upstream data, recover a clock signal corresponding to 5 Gbit/s, and send said 5 Gbit/s upstream data and said clock signal corresponding to said 5 Gbit/s upstream data to a common media access control chip for said 2.5 Gbit/s and 5 Gbit/s upstream data or to a 5 Gbit/s media access control chip; or, send said 2.5 Gbit/s and 5 Gbit/s upstream data and said clock signals corresponding to said 2.5 Gbit/s and 5 Gbit/s upstream data to said 5 Gbit/s media access control chip, so that said 5Gbit/s media access control chip discards said 2.5 Gbit/s data while keeps said 5 Gbit/s data.

In order to solve the aforementioned technical problem, the invention also provides an optical network unit (ONU), and said ONU comprises an optical module, a center processing unit (CPU) and a media access control chip (MAC), wherein:

said optical module is configured to: save different transmission rates of said ONU;

said CPU is configured to: read out said different transmission rates saved in said optical module, and adjust an operating rate of said MAC to said read-out transmission rate according to said read-out transmission rate.

In the aforementioned ONU, said optical module comprises a register configured to: save different transmission rates of said ONU;

said CPU is configured to read out said different transmission rates saved in said optical module in the following manner: reading out a transmission rate of a transmission device of said optical module from said register through a I²C pin of said optical module.

In order to solve the aforementioned technical problem, the invention also provides a passive optical network system, and said system comprises said optical line terminal (OLT) as above, and said optical network units (ONUs) with different transmission rates, wherein, emission wavelengths of said ONUs with different transmission rates are the same and upstream data are transmitted in a time division multiplexing manner under the control of said OLT; wherein:

said ONU comprises an optical module, a center processing unit (CPU) chip and a media access control (MAC) chip, and said optical module is configured to: save different transmission rates of said ONU; said CPU is configured to: read out said different transmission rates saved in said optical module, and according to said read-out transmission rate, adjust an operating rate of said MAC to said transmission rate.

In order to solve the aforementioned technical problem, the invention also provides an upstream bandwidth allocation method, and said method comprises:

receiving and forwarding upstream data transmitted by optical network units (ONUs) with different transmission rates;

recovering clock signals according to said upstream data, and saving said upstream data and said clock signals corresponding to said upstream data; and acquiring upstream rates of said upstream data according to said clock signals corresponding to said upstream data, and according to said upstream rates, allocating upstream bandwidths to said ONUs.

In the aforementioned method, the step of recovering said clock signal and saving said upstream data and said clock signal corresponding to said upstream data comprises:

according to the number n of ONUs with different transmission rates and said upstream data, recovering n channels of clock signals, and sending said upstream data and said clock signals corresponding to said upstream data to said media access control chip, to save said upstream data and said clock signals corresponding to said upstream data; or, recovering one channel of clock signal, and sending said one channel of clock signal and an electronic signal indicating the number of data lines for outputting parallel signals to said media access control chip, to save said one channel of clock signal and said electronic signal; wherein, the aforementioned n is a positive integer greater than 1.

In the aforementioned method, when said different transmission rates are 2.5 Gbit/s and 5 Gbit/s, the step of recovering said clock signal and saving said upstream data and said clock signal corresponding to said upstream data comprises:

according to 2.5 Gbit/s upstream data, recovering a clock signal corresponding to 2.5 Gbit/s, and sending said 2.5 Gbit/s upstream data and said clock signal corresponding to said 2.5 Gbit/s upstream data to a common media access control chip for 2.5 Gbit/s and 5 Gbit/s upstream data, to save said 2.5 Gbit/s upstream data and said clock signal corresponding to said 2.5 Gbit/s upstream data, or sending said 2.5 Gbit/s upstream data to a 2.5 Gbit/s media access control chip, to save said 2.5 Gbit/s upstream data and said clock signal corresponding to said 2.5 Gbit/s upstream data; and according to 5 Gbit/s rate upstream data, recovering a clock signal corresponding to 5 Gbit/s, and sending said 5 Gbit/s upstream data and said clock signal corresponding to said 5 Gbit/s upstream data to a common media access control chip for 2.5 Gbit/s and 5 Gbit/s upstream data or a 5 Gbit/s media access control chip, to save said 5 Gbit/s upstream data and said clock signal corresponding to said 5 Gbit/s upstream data; or, send said 2.5 Gbit/s and 5 Gbit/s upstream data and said clock signals corresponding to said 2.5 Gbit/s and 5 Gbit/s upstream data to said 5 Gbit/s media access control chip, so that said 5 Gbit/s media access control chip discards said 2.5 Gbit/s upstream data and said clock signal corresponding to said 2.5 Gbit/s upstream data, and saves said 5 Gbit/s upstream data and said clock signal corresponding to said 5 Gbit/s upstream data.

In order to solve the aforementioned technical problem, the invention also provides a rate adaptation method, and said method comprises:

saving different transmission rates of optical network units (ONUs); and reading out said different transmission rates, and according to said read-out transmission rates, adjusting operating rates of said media access control (MAC) chips in the ONUs to said read-out transmission rates.

The above optical line terminal, optical network unit, passive optical network system, upstream bandwidth allocation method, and rate adaptation method achieve the time division multiplexing coexistence of multiple rates supporting a single wavelength in the upstream direction without occupying the existing wavelength resources or deteriorating the performance of said upstream optical link.

PREFERRED EMBODIMENTS OF THE INVENTION

To make objectives, technical solutions and advantages of the invention more apparent, examples of the invention will be described in detail below with reference to the accompanying drawings. It should be noted that, in case of no conflict, the examples and features of the examples in the present application could be combined randomly with each other.

An example of the invention provides an OLT, and the OLT comprises: an optical module, a clock and data recovery module, a media access control chip and a control module, wherein:

the optical module is configured to: receive upstream data sent by optical network units (ONUs) with different transmission rates and send the upstream data to the clock and data recovery module;

the clock and data recovery module is configured to: receive the upstream data, recover clock signals according to the upstream data, and send the upstream data and the clock signals corresponding to the upstream data to the media access control chip;

the media access control chip is configured to: save the upstream data and the clock signals corresponding to the upstream data;

the control module is configured to: according to the clock signals corresponding to the upstream data, acquire the upstream rate of the upstream data from the media access control chip, and allocate upstream bandwidths to the ONUs according to the upstream rate.

In the OLT in accordance with the present embodiment, the number of the clock and data recovery modules can be set dynamically as desired, for example, can be set to one, two or three, and so on; of course, two clock and data recovery modules can be combined into a double-rate clock and data recovery module; and three clock and data recovery module can be combined into a triple-rate clock and data recovery module, and so on.

Preferably, when there is one clock and data recovery module, the aforementioned clock and data recovery module can be configured to receive upstream data with different transmission rates, recover n channels of clock signals according to the number n of the ONUs with different transmission rates and the above upstream data, and send the above upstream data and the clock signals corresponding to the upstream data to the media access control chip; or recover one channel of clock signal, and send the one channel of clock signal and an electronic signal indicating the number of data lines for outputting the parallel signals to the media access control chip; wherein the n is a positive integer greater than 1. When the aforementioned different transmission rates are 2.5 Gbit/s and 5 Gbit/s, the aforementioned clock and data recovery module can be further configured to, recover two channels of clock signals according to the 2.5 Gbit/s and 5 Gbit/s upstream data, and send the clock signals to the media access control chip; or, recover one channel of clock signal according to the 2.5 Gbit/s and 5 Gbit/s upstream data, and for the 2.5 Gbit/s and 5 Gbit/s upstream data, respectively provide electronic signals indicating the number of the data lines for outputting the parallel signals, and send the electronic signals to the media access control chip. In this case, the clock and data recovery module is a dual-rate clock and data recovery module.

Preferably, when there are at least two clock and data recovery modules, the clock and data recovery modules are configured to: receive upstream data, recover clock signals according to the upstream data, and send the upstream data and the clock signals corresponding to the upstream data to the media access control chip. When the different transmission rates are 2.5 Gbit/s and 5 Gbit/s, and there are two clock and data recovery modules (that is, including the first clock and data recovery module and the second clock and data recovery module), the first clock and data recovery module can be configured to: recover a clock signal corresponding to 2.5 Gbit/s according to the 2.5 Gbit/s upstream data, and send the 2.5 Gbit/s upstream data and the clock signal corresponding to the 2.5 Gbit/s upstream data to a common media access control chip or to a 2.5 Gbit/s media access control chip; the second clock and data recovery module can be used to recover a clock signal corresponding to 5 Gbit/s according to the 5 Gbit/s upstream data, and send the 5 Gbit/s upstream data and the corresponding clock signal to the common media access control chip for the two clock and data recovery modules or to a 5 Gbit/s media access control chip; alternatively, send the 2.5 Gbit/s and 5 Gbit/s upstream data and the clock signals corresponding to the 2.5 Gbit/s and 5 Gbit/s upstream data to the 5 Gbit/s media access control chip, so that the aforementioned 5 Gbit/s media access control chip discards the 2.5 Gbit/s data but keeps the 5 Gbit/s data. In this case, the first and second clock and data recovery modules are combined into one dual-rate clock and data recovery module.

Of course, if there are more, such as three or four transmission rates, clock signals corresponding to different transmission rates can be recovered by extending the number of the clock and data recovery modules, which will not be discussed in detail here.

The OLT can support the coexistence of multiple upstream rates.

The embodiment of the invention also provides an ONU, the ONU comprises: an optical module, an Center Processing Unit (CPU) and a Media Access Control (MAC) chip, wherein: the optical module is configured to: save different transmission rates of the ONU; the CPU is configured to: read out different transmission rates saved in the optical module, and according to the read-out transmission rate, adjust the operating rate of the MAC chip to the read-out transmission rate.

Preferably, the optical module comprises a register, and the register is configured to: save different transmission rates of the ONU; the CPU can be further configured to: through the $I^2C$ pins of the optical module, read out different transmission rates of the register, thereby obtaining the transmission rates of the transmission device of the optical module.

The aforementioned ONU can achieve the adaptation of the MAC operating rate with the transmission rate of the optical module.

The embodiment of the invention also provides a passive optical network system, and the system comprises the OLT and the ONUs in accordance with the aforementioned embodiment, wherein the emission wavelengths of the ONUs with different transmission rates are the same and the upstream data are transmitted in a time division multiplexing manner under the control of the OLT.

The aforementioned passive optical network system supports the division multiplexing coexistence of multiple rates with a single wavelength in the upstream direction without occupying the existing wavelength resources or deteriorating the upstream optical link performance.

In the following, specific examples are used to describe the OLT, the ONU and the passive optical network system including the OLT and ONUs in detail:

THE FIRST EXAMPLE

In this example, the rate of the ONU can be adjusted, and there is only one clock and data recovery module in the OLT.

Figure 2:
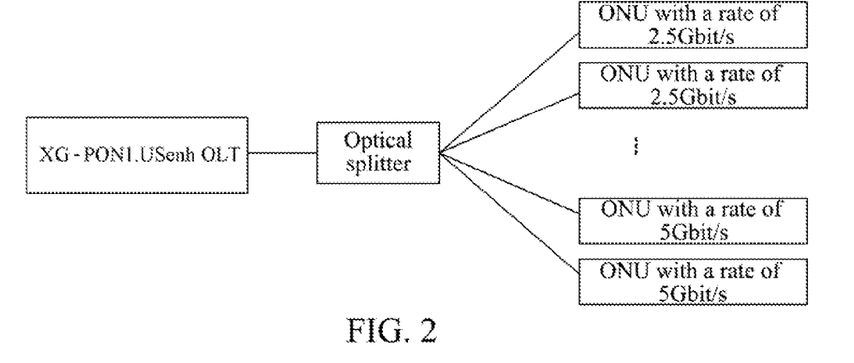
FIG. 2 is a structural diagram of a PON system in accordance with an example of the invention.

The topological structure of the PON system supporting the two upstream rates of 2.5 Gbit/s and 5 Gbit/s is shown in FIG. 2, wherein both the upstream wavelength of the ONU whose upstream rate is 2.5 Gbit/s and that of the ONU whose upstream rate is 5 Gbit/s are 1260-1280 nm, and both kinds of the ONUs use time division multiplexing to transmit upstream data under the control of the OLT.

Figure 3:
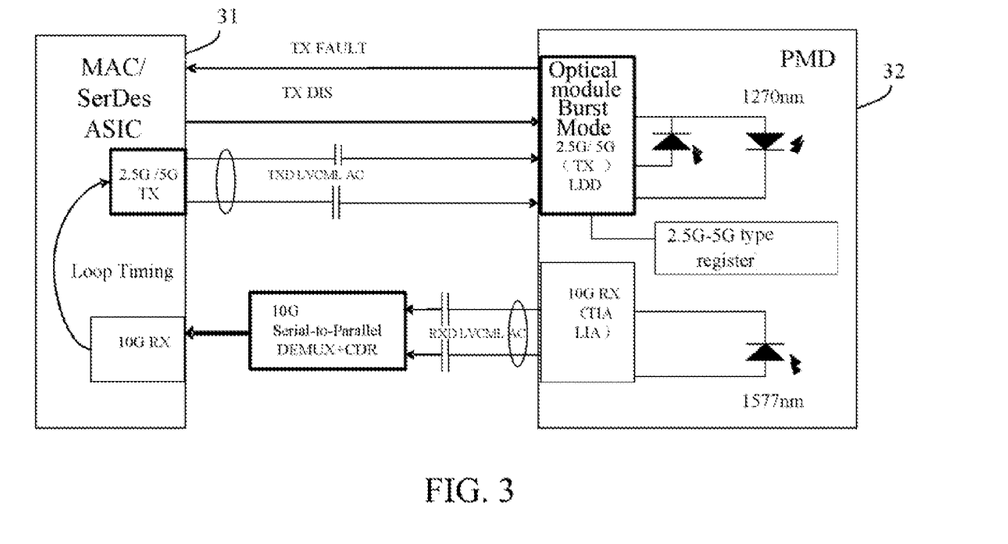
FIG. 3 is an architectural diagram of an ONU in the PON system in accordance with an example of the invention.

Except that the rates of optical transmission devices are different, those of the other components of the optical modules in the ONUs with upstream rates of 2.5 Gbit/s and 5 Gbit/s are the same, and the architectural diagram of the ONU shown in FIG. 3 mainly comprises the Media Access Control (MAC) 31 and the Physical Medium Dependent (PMD) 32, wherein, the transmission rate of the optical transmission device of the optical module in the ONU whose upstream rate is 2.5 Gbit/s is 2.5 Gbit/s, and the transmission rate of the optical transmission device of the optical module in the ONU whose upstream rate is 5 Gbit/s is 5 Gbit/s. This structure design is advantageous to improve the versatility of ONU components with different rates, which reduces the cost of the 5 Gbit/s ONU. A register of the optical module in the ONU saves the upstream rate value of the ONU, and after the ONU is powered on, the CPU in the ONU reads the register of the optical module in the ONU through the I²C pin of the ONU optical module to acquire whether the transmission rate of the transmission device of the optical module is 2.5 Gbit/s or 5 Gbit/s, and then adjusts the operating rate of the MAC in the ONU to the transmission rate of the optical module, that is, 2.5 Gbit/s or 5 Gbit/s.

Figure 4:
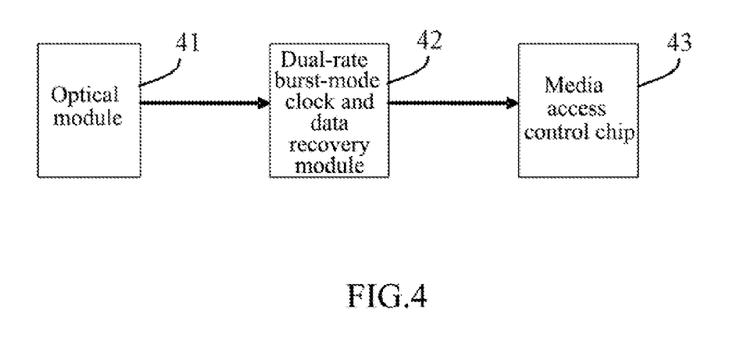
FIG. 4 is a structural diagram of a first example of OLT components in the PON system in accordance with the invention.
Figure 5:
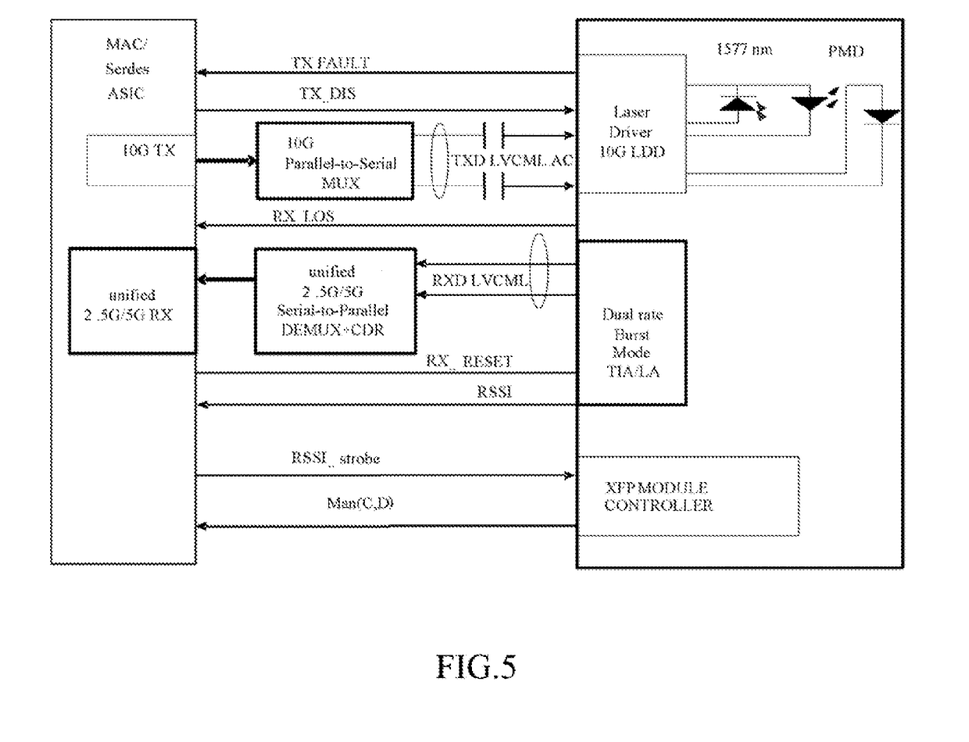
FIG. 5 is an architectural diagram of a first example of OLT in the PON system in accordance with the invention.

The structure of some components of the OLT is shown in FIG. 4, and the OLT mainly comprises an optical module 41, a dual-rate burst-mode clock and data recovery module 42 and a media access control chip 43. FIG. 5 is a diagram of the first example of the OLT in the PON system in accordance with the invention. After the optical module in the OLT receives optical signals carrying 2.5 Gbit/s and 5 Gbit/s upstream data sent by the ONU, it converts the optical signals to electrical signals, and outputs the electrical signals to the dual-rate burst-mode clock and data recovery module. After the dual-rate burst-mode clock and data recovery module receives the 2.5 Gbit/s electric signal, it recovers the clock signal corresponding to the 2.5 Gbit/s electric signals, and sends the recovered clock and data to the media access control chip. After the dual-rate burst-mode clock and data recovery module receives the 5 Gbit/s electric signals, it recovers the clock signal corresponding to the 5 Gbit/s electrical signal, and sends the recovered clock and data to the media access control chip, and then the software system of the OLT can acquire the upstream data and the upstream rate of the ONU sending the upstream data from the media access control chip, and the OLT saves the upstream rate information of the ONU, and according to the information, allocates upstream bandwidth to the ONU.

THE SECOND EXAMPLE

In this embodiment, the rate of the ONU can be adjusted, and there is only one clock and data recovery module in the OLT.

The topological structure of the PON system respectively supporting the upstream rates of 2.5 Gbit/s and 5 Gbit/s is shown in FIG. 2, wherein, both the upstream wavelength of the ONU whose upstream rate is 2.5 Gbit/s and that of the ONU whose upstream rate is 5 Gbit/s are 1260-1280 nm, and both kinds of the ONUs use TDM to transmit upstream data under the control of the OLT.

Except that the rates of optical transmission devices are different, those of the other components of the optical modules in the ONUs with upstream rates of 2.5 Gbit/s and 5 Gbit/s are the same, and the architectural diagram of the ONU shown in FIG. 3 mainly comprises the MAC and the PMD, wherein, the transmission rate of the optical transmission device of the optical module in the ONU whose upstream rate is 2.5 Gbit/s is 2.5 Gbit/s, and the transmission rate of the optical transmission device of the optical module in the ONU whose upstream rate is 5 Gbit/s is 5 Gbit/s. This structure design is advantageous to improve the versatility of ONU components with different rates, which reduces the cost of the 5 Gbit/s ONU. A register of the optical module in the ONU saves the upstream rate value of the ONU, and after the ONU is powered on, the CPU in the ONU reads the register of the optical module of the ONU through the I²C pin of the optical module of the ONU to acquire whether the transmission rate of the transmission device of the optical module is 2.5 Gbit/s or 5 Gbit/s, and then adjusts the operating rate of the MAC in the ONU to the transmission rate of the optical module, that is, 2.5 Gbit/s or 5 Gbit/s.

The structure of some components of the OLT is shown in FIG. 4, and the OLT mainly comprises an optical module 41, a dual-rate burst-mode clock and data recovery module 42 and a media access control chip 43. FIG. 5 is a diagram of the first example of the OLT in the PON system in accordance with the invention. After the optical module in the OLT receives optical signals carrying the 2.5 Gbit/s and 5 Gbit/s upstream data sent by the ONU, it converts the optical signals to electrical signals, and outputs the electrical signals to the dual-rate burst-mode clock and data recovery module. After the dual-rate burst-mode clock and data recovery module in the OLT receives the 2.5 Gbit/s and 5 Gbit/s signals, it recovers a common clock signal, sends the 2.5 Gbit/s signal to the media access control chip through 4 parallel data lines, sends the 5 Gbit/s signal to the media access control chip through 8 parallel data lines, and provides an effective level to indicate the number of data lines for transmitting the parallel signals.

THE THIRD EXAMPLE

In this embodiment, the rate of the ONU can be adjusted, and there are two clock and data recovery modules in the OLT.

The topological structure of the PON system respectively supporting the upstream rates of 2.5 Gbit/s and 5 Gbit/s is shown in FIG. 2, wherein, both the upstream wavelength of the ONU whose upstream rate is 2.5 Gbit/s and that of the ONU whose upstream rate is 5 Gbit/s are 1260-1280 nm, and both kinds of the ONUs use TDM to transmit upstream data under the control of the OLT.

Except that the rates of optical transmission devices are different, those of the other components of the optical modules in the ONU with an upstream rate of 2.5 Gbit/s and the ONU with an upstream rate of 5 Gbit/s are the same, and the architectural diagram of the ONU shown in FIG. 3 mainly comprises the MAC and the PMD, wherein, the transmission rate of the optical transmission device of the optical module in the ONU whose upstream rate is 2.5 Gbit/s is 2.5 Gbit/s, and the transmission rate of the optical transmission device of the optical module in the ONU whose upstream rate is 5 Gbit/s is 5 Gbit/s. This structure design is advantageous to improve the versatility of ONU components with different rates, which reduces the cost of the 5 Gbit/s ONU. A register of the optical module in the ONU saves the upstream rate value of the ONU, and after the ONU is powered on, the CPU in the ONU reads the register of the optical module in the ONU through the I²C pin of the optical module of the ONU to acquire whether the transmission rate of the transmission device of the optical module is 2.5 Gbit/s or 5 Gbit/s, and then adjusts the operating rate of the MAC in the ONU to the transmission rate of the optical module, that is, 2.5 Gbit/s or 5 Gbit/s.

Figure 6:
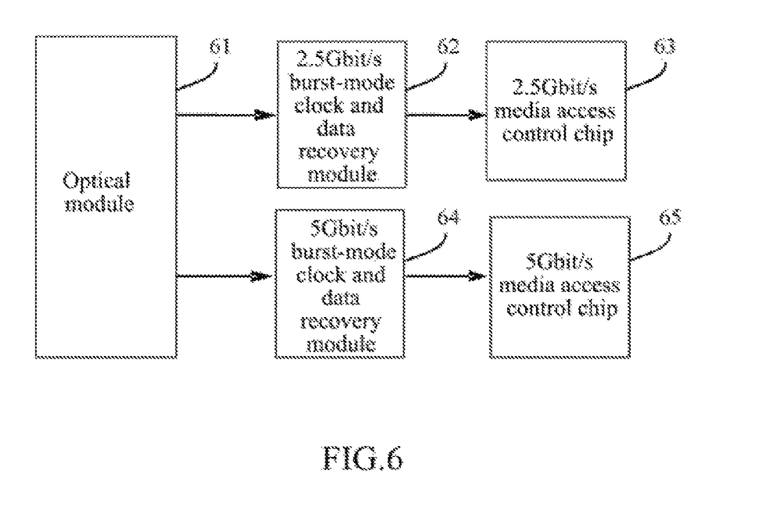
FIG. 6 is a structural diagram of a second example of OLT components in the PON system in accordance with the invention.
Figure 7:
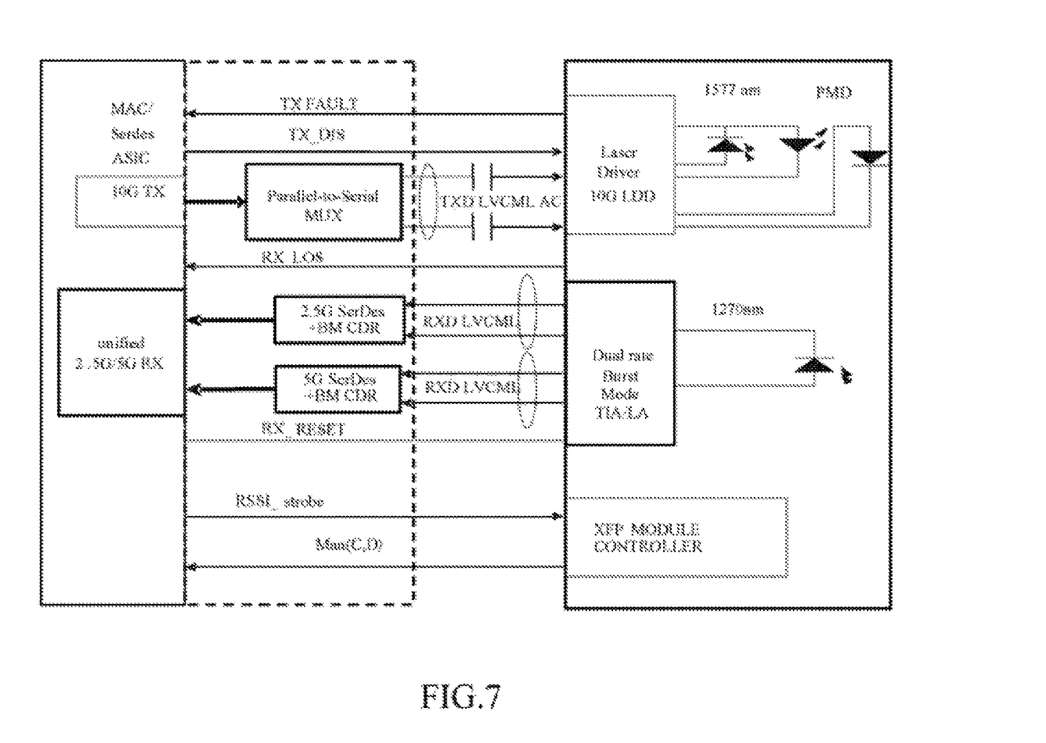
FIG. 7 is an architectural diagram of a second example of OLT in the PON system in accordance with the invention.

In this example, the structure of some components of the OLT is shown in FIG. 6, and the OLT comprises an optical module 61, a 2.5 Gbit/s burst-mode clock and data recovery module 62, a 2.5 Gbit/s media access control chip 63, a 5 Gbit/s burst-mode clock and data recovery module 64 and a 5 Gbit/s media access control chip 65. FIG. 7 shows the architectural diagram of the second example of the OLT in the PON system in accordance with the invention. After the optical module in the OLT receives optical signals carrying the 2.5 Gbit/s and 5 Gbit/s upstream data sent by the ONU, it converts the optical signals to electrical signals, splits the electrical signals into two channels of signals and inputs them to the two clock and data recovery modules with rates of 2.5 Gbit/s and 5 Gbit/s respectively. The 2.5 Gbit/s burst-mode clock and data recovery module recovers the 2.5 Gbit/s electrical signals and discards the 5 Gbit/s electrical signals, and then sends the recovered 2.5 Gbit/s data to the 2.5 Gbit/s media access control chip. After the 5 Gbit/s burst-mode clock and data recovery module recovers the 2.5 Gbit/s electrical signals and the 5 Gbit/s data, it sends the recovered 5 Gbit/s data to the media access control chip, and the media access control chip discards the 2.5 Gbit/s data while keeps the 5 Gbit/s data. Then the software system of the OLT can acquire the upstream data and the upstream rate of the ONU sending the upstream data from the media access control chip, the OLT saves the upstream rate information of the ONU, and according to the information, allocates upstream bandwidth to the ONU.

THE FOURTH EXAMPLE

In this example, the rate of the ONU is fixed, and there is only one clock and data recovery module in the OLT.

The topological structure of the PON system respectively supporting the upstream rates of 2.5Gbit/s and 5 Gbit/s is shown in FIG. 2, wherein, both the upstream wavelength of the ONU whose upstream rate is 2.5 Gbit/s and that of the ONU whose upstream rate is 5 Gbit/s are 1260-1280 nm, and both kinds of the ONUs use TDM to transmit upstream data under the control of the OLT.

The structure of some components of the OLT is shown in FIG. 4, and the OLT mainly comprises an optical module 41, a dual-rate burst-mode clock and data recovery module 42 and a media access control chip 43. FIG. 5 is a diagram of the first example of the OLT in the PON system in accordance with the invention. After the optical module in the OLT receives optical signals carrying the 2.5 Gbit/s and 5 Gbit/s upstream data sent by the ONU, it converts the optical signals to electrical signals, and outputs the electrical signals to the dual-rate burst-mode clock and data recovery module. After the dual-rate burst-mode clock and data recovery module receives the 2.5 Gbit/s electrical signals, it recovers a clock signal corresponding to the 2.5 Gbit/s electrical signals, sends the recovered clock and data to the media access control chip. After the dual-rate burst-mode clock and data recovery module receives the 5 Gbit/s electric signals, it recovers a clock signal corresponding to the 5 Gbit/s electrical signals, and sends the recovered clock and data to the media access control chip. Then the software system of the OLT can acquire the upstream data and the upstream rate of the ONU sending the upstream data from the media access control chip, and the OLT saves the upstream rate information of the ONU, and according to the information, allocates upstream bandwidth to the ONU.

THE FIFTH EXAMPLE

In this example, the rate of the ONU is fixed, and there is only one clock and data recovery module in the OLT.

The topological structure of the PON system respectively supporting the upstream rates of 2.5 Gbit/s and 5 Gbit/s is shown in FIG. 2, wherein, both the upstream wavelength of the ONU whose upstream rate is 2.5 Gbit/s and that of the ONU whose upstream rate is 5 Gbit/s are 1260-1280 nm, and both kinds of the ONUs use TDM to transmit upstream data under the control of the OLT.

The structure of some components of the OLT is shown in FIG. 4, and the OLT mainly comprises an optical module 41, a dual-rate burst-mode clock and data recovery module 42 and a media access control chip 43. FIG. 5 is a diagram of the first example of the OLT in the PON system in accordance with the invention. After the optical module in the OLT receives optical signals carrying the 2.5 Gbit/s and 5 Gbit/s upstream data sent by the ONU, it converts the optical signals to electrical signals, and outputs the electrical signals to the dual-rate burst-mode clock and data recovery module. After the dual-rate burst-mode clock and data recovery module in the OLT receives the 2.5 Gbit/s and 5 Gbit/s signals, it recovers a common clock signal, sends the 2.5 Gbit/s signals to the media access control chip through 4 parallel data lines, sends the 5 Gbit/s signals to the media access control chip through 8 parallel data lines, and provides an effective level to indicate the number of data lines for transmitting the parallel signals.

THE SIXTH EXAMPLE

In this example, the rate of the ONU is fixed, and there are two clock and data recovery modules in the OLT.

The topological structure of the PON system respectively supporting the upstream rates of 2.5 Gbit/s and 5 Gbit/s is shown in FIG. 2, wherein, both the upstream wavelength of the ONU whose upstream rate is 2.5 Gbit/s and that of the ONU whose upstream rate is 5 Gbit/s are 1260-1280 nm, and both kinds of the ONUs use TDM to transmit upstream data under the control of the OLT.

In this example, the structure of some components of the OLT is shown in FIG. 6, and the OLT mainly comprises an optical module 61, a 2.5 Gbit/s burst-mode clock and data recovery module 62, a 2.5 Gbit/s media access control chip 63, a 5 Gbit/s burst-mode clock and data recovery module 64 and to 5 Gbit/s Media access control chip 65. FIG. 7 shows the architecture diagram of the second example of the OLT in the PON system in accordance with the invention. After the optical module in the OLT receives optical signals carrying the 2.5 Gbit/s and 5 Gbit/s upstream data sent by the ONU, it converts the optical signals to the electric signals, and splits the electrical signals into two channels of signals and inputs them to the two clock and data recovery module with rates of 2.5 Gbit/s and 5 Gbit/s respectively. The 2.5 Gbit/s burst-mode clock and data recovery module recovers the 2.5 Gbit/s electric signals and discards the 5 Gbit/s electric signals, and then sends the recovered 2.5 Gbit/s data to the media access control chip. After the 5 Gbit/s burst mode clock and data recovery module recovers the 2.5 Gbit/s electrical signals and the 5 Gbit/s data, it sends the recovered data to the media access control chip, and the media access control chip discards the 2.5 Gbit/s data while keeps the 5 Gbit/s data. Then the software system of the OLT can acquire the upstream data and the upstream rate of the ONU sending the upstream data from the media access control chip, the OLT saves the upstream rate information of the ONU, and according to the information, allocates upstream bandwidth to the ONU.

Figure 8:
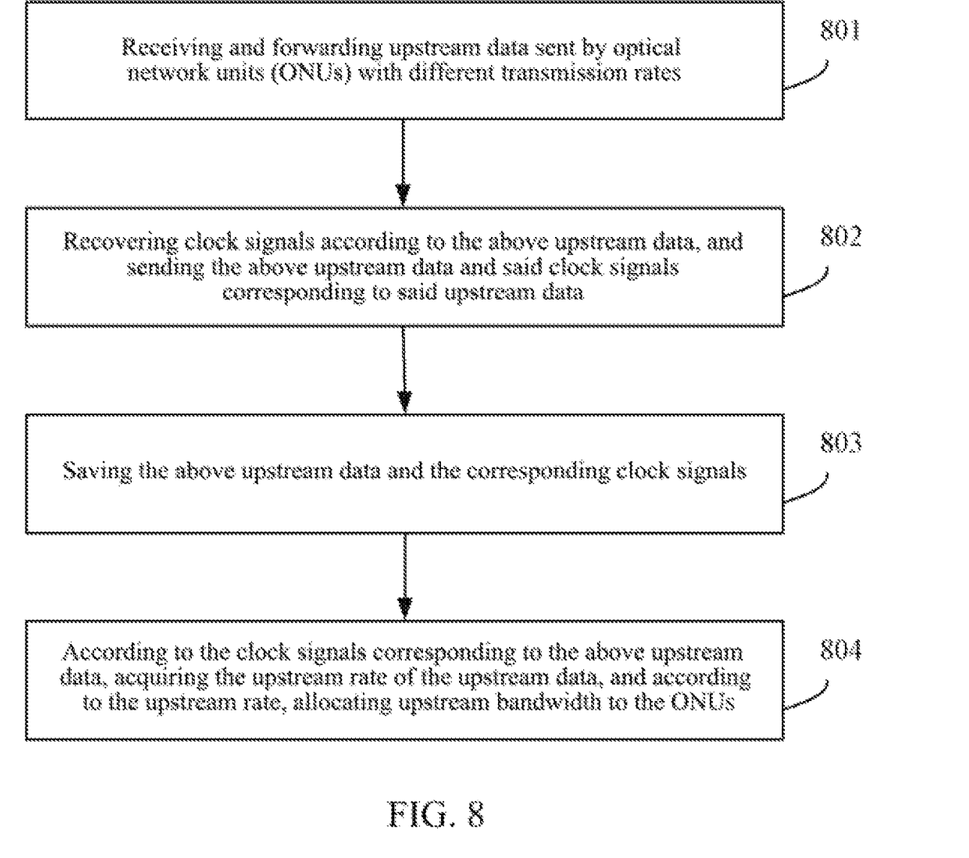
FIG. 8 is a flow chart of an upstream bandwidth allocation method in accordance with an example of the invention.

FIG. 8 shows a flow chart of the upstream bandwidth allocation method in accordance with an example of the invention, and the method is described from the side of the OLT. The method comprises:

step 801, receiving and forwarding upstream data sent by the optical network units (ONUs) with different transmission rates;

the optical module in the OLT receives and forwards the aforementioned upstream data;

step 802, recovering the clock signals according to the upstream data, and sending the upstream data and the clock signals corresponding to the upstream data;

after the clock and data recovery module in the OLT recovers the clock signals, it sends the clock signals to the MAC in the OLT;

step 803, saving the upstream data and the corresponding clock signals;

the MAC in the OLT saves the clock signals;

wherein, steps 802 and 803 are recovering the clock signals based on the upstream data and storing the upstream data and the corresponding clock signals;

step 804, according to the clock signals corresponding to the upstream data, acquiring the upstream rate of the upstream data, and according to the upstream rate, allocating upstream bandwidth to the ONUs.

The control module in the OLT acquires the upstream rate in accordance with the clock signal and allocates upstream bandwidth to the ONU according to the upstream rate.

In the upstream bandwidth allocation method, the step of recovering the clock signals and saving the upstream data and the clock signals corresponding to the upstream data might comprise:

according to the number n of ONUs with different transmission rates and the upstream data, recovering n channels of clock signals, and sending the upstream data and the clock signals corresponding to the upstream data to the media access control chip, to save the upstream data and the clock signals corresponding to the upstream data; or, recovering one channel of clock signal, and sending the one channel of clock signal and the electronic signal indicating the number of data lines for outputting the parallel signals to the media access control chip, to save the channel of clock signal and the electronic signal; wherein, the aforementioned n is a positive integer greater than 1.

Alternatively,

In the aforementioned upstream bandwidth allocation method, when the different transmission rates are 2.5 Gbit/s and 5 Gbit/s, the step of recovering the clock signal and saving the upstream data and the clock signal corresponding to the upstream data comprises:

according to the 2.5 Gbit/s upstream data, recovering the clock signal corresponding to the 2.5 Gbit/s rate, and sending the 2.5 Gbit/s upstream data and the clock signal corresponding to the 2.5 Gbit/s upstream data to a common media access control chip of the 2.5 Gbit/s and 5 Gbit/s upstream data, to save the 2.5 Gbit/s upstream data and the clock signal corresponding to the 2.5 Gbit/s upstream data, or sending to the 2.5 Gbit/s media access control chip, to save the 2.5 Gbit/s upstream data and the clock signal corresponding to the 2.5 Gbit/s upstream data; and according to the 5 Gbit/s upstream data, recovering the clock signal corresponding to the 5 Gbit/s rate, and sending the 5 Gbit/s upstream data and the clock signal corresponding to the 5 Gbit/s upstream data to a common media access control chip for the 2.5 Gbit/s and 5 Gbit/s upstream data, to save the 5 Gbit/s upstream data and the clock signal corresponding to the 5 Gbit/s upstream data; or, sending the 2.5 Gbit/s and 5 Gbit/s upstream data and the clock signals corresponding to the 2.5 Gbit/s and 5 Gbit/s upstream data to the 5 Gbit/s media access control chip, so that the 5 Gbit/s media access control chip discards the 2.5 Gbit/s upstream data and the clock signal corresponding to the 2.5 Gbit/s upstream data, and saves the 5 Gbit/s upstream data and the clock signal corresponding to the 5 Gbit/s upstream data.

The structure of the OLT for achieving the aforementioned upstream bandwidth allocation can refer to FIGS. 4-7, and will not be mentioned here.

The upstream bandwidth allocation method supports the coexistence of multiple upstream rates.

Figure 9:
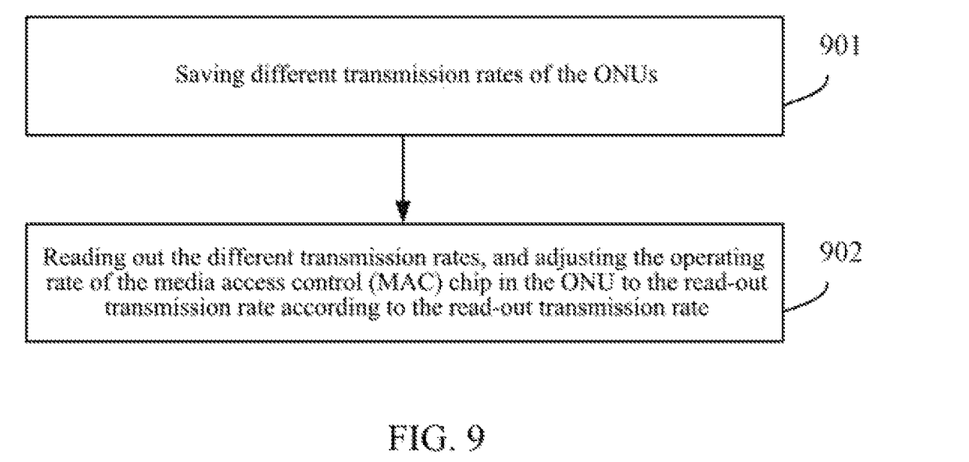
FIG. 9 is a flow chart of a rate adaptation method in accordance with an example of the invention.

FIG. 9 shows a flow rate of the rate adaptation method in accordance with the example of the invention, and the method is described from the side of the ONU. The method comprises:

step 901, saving different transmission rates of the ONU;

the optical module in the ONU comprises a register, and the register saves different transmission rates, such as 2.5 Gbit/s and 5 Gbit/s transmission rates, and so on;

step 902, reading out the different transmission rates, and adjusting the operating rate of the media access control (MAC) chip in the ONU to the read-out transmission rate according to the read-out transmission rate.

The CPU in the ONU reads out the transmission rates, and based on the read-out transmission rates, adjusts the operating rate of the MAC to the read-out transmission rate.

The structure of the ONU for achieving the aforementioned rate adaptation method can refer to FIG. 3, and will not be mentioned here.

The rate adaptation method can achieve rate matching.

The person of ordinary skill in the art can appreciate that all or part of the steps in the aforementioned method can be implemented by the program instructing the related hardware, and the program can be saved in a computer readable storage medium, such as read-only memory, disk, or CD-ROM. Optionally, all or part of the steps in the aforementioned embodiments can also be implemented with one or more integrated circuits. Accordingly, each module/unit in the above embodiments can be implemented in the form of hardware or software functional modules. The invention is not limited to any particular form of hardware and software combination.

The above embodiments are only used to illustrate but not limit the technical scheme of the invention, and the invention is only described in detail with reference to the preferred embodiments. It should be understood by a person of ordinary skill in the art that a variety of modifications and equivalences can be made without departing from the principles of the invention, and these modifications and equivalences should be included within the claims of the invention.

INDUSTRIAL APPLICABILITY

The invention achieves time division multiplexing coexistence multiple rates supporting a single wavelength in the upstream direction without occupying the existing wavelength resources or deteriorating the performance of the upstream optical link.

What is claimed is:

1. An optical line terminal (OLT), comprising: an optical module, a clock and data recovery module, a media access control chip and a control module, wherein:
said optical module is configured to: receive upstream data sent by optical network units (ONUs) with different transmission rates on a single wavelength and send said upstream data to said clock and data recovery module;
said clock and data recovery module is configured to: receive said upstream data, recover one or more channels of clock signals according to said upstream data, and send said upstream data and said clock signal corresponding to said upstream data to said media access control chip;
said media access control chip is configured to: save said upstream data and said clock signal corresponding to said upstream data;
said control module is configured to: acquire an upstream rate of said upstream data according to said clock signal corresponding to said upstream data, and allocate an upstream bandwidth to said ONU according to said upstream rate;
wherein said optical module further comprises a Dual rate Burst Mode TIA/LA and one wideband photon detector to receive said upstream data with different transmission rates on a single wavelength.

2. The optical line terminal according to claim 1, wherein when there is one clock and data recovery module,
said clock and data recovery module is configured to receive said upstream data, recover said one or more channels of clock signals, and send said upstream data and said one or more channel of clock signals corresponding to said upstream data to said media access control chip in the following manner: receiving upstream data with different transmission rates, recovering n channels of clock signals according to the number n of said ONUs with different transmission rates on the single wavelength and said upstream data, and sending said upstream data and said clock signals corresponding to said upstream data to said media access control chip; or, recovering one channel of clock signal according to the number n of said ONUs with different transmission rates on the single wavelength and said upstream data, and sending said one channel of clock signal and an electronic signal indicating the number of data lines for outputting parallel signals to said media access control chip; wherein, said n is a positive integer greater than 1.

3. The optical line terminal according to claim 1, wherein there are at least two said clock and data recovery modules.

4. The optical line terminal according to claim 2, wherein when said different transmission rates are 2.5 Gbit/s and 5 Gbit/s,
said clock and data recovery module is configured to recover said one or more channels of clock signals and send said upstream data and said one or more channel of clock signals corresponding to said upstream data to said media access control chip in the following manner:
recovering two channels of clock signals according to 2.5 Gbit/s and 5 Gbit/s upstream data, and sending said upstream data and said clock signals corresponding to said upstream data to said media access control chip; or,
recovering one channel of clock signal according to 2.5 Gbit/s and 5 Gbit/s upstream data, providing electronic signals indicating the number of data lines for outputting parallel signals for said 2.5 Gbit/s and 5 Gbit/s upstream data respectively, and sending said electronic signals to said media access control chip.

5. The optical line terminal according to claim 3, wherein when said different transmission rates are 2.5 Gbit/s and 5 Gbit/s, and there are two clock and data recovery modules,
a first clock and data recovery module is configured to:
recover a channel of clock signal corresponding to 2.5 Gbit/s according to 2.5 Gbit/s upstream data, and send said 2.5 Gbit/s upstream data and said clock signal corresponding to said 2.5 Gbit/s upstream data to a common media access control chip for said 2.5 Gbit/s and 5 Gbit/s upstream data or to a 2.5 Gbit/s media access control chip;
a second clock and data recovery module is configured to:
recover a channel of clock signal corresponding to 5 Gbit/s according to 5 Gbit/s upstream data, and send said 5 Gbit/s upstream data and said clock signal corresponding to said 5 Gbit/s upstream data to a common media access control chip for said 2.5 Gbit/s and 5 Gbit/s upstream data or to a 5 Gbit/s media access control chip; or,
send said 2.5 Gbit/s and 5 Gbit/s upstream data and said clock signals corresponding to said 2.5 Gbit/s and 5 Gbit/s upstream data to said 5 Gbit/s media access control chip, so that said 5 Gbit/s media access control chip discards said 2.5 Gbit/s data and keeps said 5 Gbit/s data.

6. A passive optical network system, comprising the optical line terminal (OLT) as claimed in claim 1, and optical network units (ONUs) with different transmission rates on a single wavelength, wherein, emission wavelengths of said ONUs with different transmission rates are the same and upstream data are transmitted in a time division multiplexing manner under the control of said OLT; wherein:
said ONU comprises an optical module, a center processing unit (CPU) chip and a media access control (MAC) chip, and said optical module is configured to: save different transmission rates of said ONU; said CPU is configured to: read out said different transmission rates saved in said optical module, and according to a read-out transmission rate, adjust an operating rate of said MAC to said transmission rate.

7. An upstream bandwidth allocation method, comprising following steps of:
receiving and forwarding upstream data transmitted by optical network units (ONUs) with different transmission rates on a single wavelength, wherein the upstream data with said different transmission rates is received through one wideband photon detector and a Dual rate Burst Mode TIA/LA;
recovering one or more channels of clock signals according to said upstream data, and saving said upstream data and said one or more channels of clock signals corresponding to said upstream data; and
acquiring upstream rates of said upstream data according to said one or more channels of clock signals corresponding to said upstream data, and according to said upstream rates, allocating upstream bandwidths to said ONUs;
wherein, the step of recovering one ore more channels of clock signals and saving said upstream data and said one or more channels of clock signals corresponding to said upstream data comprises:
according to the number n of ONUs with different transmission rates on the single wavelength and said upstream data, recovering n channels of clock signals, and sending said upstream data and said clock signals corresponding to said upstream data to a media access control chip, to save said upstream data and said clock signals corresponding to said upstream data; or, recovering one channel of clock signal, and sending said one channel of clock signal and an electronic signal indicating the number of data lines for outputting parallel signals to said media access control chip, to save said one channel of clock signal and said electronic signal; wherein, the aforementioned n is a positive integer greater than 1.

8. The method according to claim 7, wherein, when said different transmission rates are 2.5 Gbit/s and 5 Gbit/s, the step of recovering one or more channels of clock signals and saving said upstream data and said one or more channels of clock signals corresponding to said upstream data comprises:

recovering a channel of clock signal corresponding to 2.5 Gbit/s according to 2.5 Gbit/s upstream data, and sending said 2.5 Gbit/s upstream data and said clock signal corresponding to said 2.5 Gbit/s upstream data to a common media access control chip for 2.5 Gbit/s and 5 Gbit/s upstream data, to save said 2.5 Gbit/s upstream data and said clock signal corresponding to said 2.5 Gbit/s upstream data, or sending said 2.5 Gbit/s upstream data and said clock signal corresponding to said 2.5 Gbit/s upstream data to a 2.5 Gbit/s media access control chip, to save said 2.5 Gbit/s upstream data and said clock signal corresponding to said 2.5 Gbit/s upstream data; and recovering a channel of clock signal corresponding to 5 Gbit/s according to 5 Gbit/s upstream data, and sending said 5 Gbit/s upstream data and said clock signal corresponding to said 5 Gbit/s upstream data to a common media access control chip for 2.5 Gbit/s and 5 Gbit/s upstream data or a 5 Gbit/s media access control chip, to save said 5 Gbit/s upstream data and said clock signal corresponding to said 5 Gbit/s upstream data; or, send said 2.5 Gbit/s and 5 Gbit/s upstream data and said clock signals corresponding to said 2.5 Gbit/s and 5 Gbit/s upstream data to said 5 Gbit/s media access control chip, so that said 5 Gbit/s media access control chip discards said 2.5 Gbit/s upstream data and said clock signal corresponding to said 2.5 Gbit/s upstream data, and saves said 5 Gbit/s upstream data and said clock signal corresponding to said 5 Gbit/s upstream data.

* * * * *